United States Patent
Nakayama (10) Patent No.: US 9,767,411 B2
(45) Date of Patent: Sep. 19, 2017

(54) RULE DISCOVERY SYSTEM, METHOD, APPARATUS, AND PROGRAM

(71) Applicant: NEC Corporation, Tokyo (JP)

(72) Inventor: Hiroki Nakayama, Tokyo (JP)

(73) Assignee: NEC Corporation, Tokyo (JP)

(*) Notice: Subject to any disclaimer, the term of this patent is extended or adjusted under 35 U.S.C. 154(b) by 378 days.

(21) Appl. No.: 14/401,019

(22) PCT Filed: May 13, 2013

(86) PCT No.: PCT/JP2013/063317
§ 371 (c)(1),
(2) Date: Nov. 13, 2014

(87) PCT Pub. No.: WO2013/172309
PCT Pub. Date: Nov. 21, 2013

(65) Prior Publication Data
US 2015/0142712 A1    May 21, 2015

(30) Foreign Application Priority Data

May 14, 2012  (JP) ................ 2012-110922

(51) Int. Cl.
*G06F 15/18* (2006.01)
*G06N 5/02* (2006.01)
(Continued)

(52) U.S. Cl.
CPC ....... *G06N 5/025* (2013.01); *G06F 17/30943* (2013.01); *G06N 3/004* (2013.01);
(Continued)

(58) Field of Classification Search
None
See application file for complete search history.

(56) References Cited

U.S. PATENT DOCUMENTS 5,481,703 A    1/1996  Kato
6,061,682 A *  5/2000  Agrawal ......... G06F 17/30539
                                              707/694
(Continued)

FOREIGN PATENT DOCUMENTS

JP   H06-110749 A    4/1994
JP   2006-058974 A   3/2006
WO   WO-2004/036496 A1   4/2004

OTHER PUBLICATIONS

International Search Report corresponding to PCT/JP2013/063317, dated Jul. 9, 2013 (3 pages).
(Continued)

*Primary Examiner* — Kakali Chaki
*Assistant Examiner* — Ababacar Seck
(74) *Attorney, Agent, or Firm* — Wilmer Cutler Pickering Hale and Dorr LLP (57) ABSTRACT

A system includes a free itemset generation unit to generate a set of free itemsets, each having a frequency in the database greater than or equal to a predetermined threshold value set in advance, a valid rule candidate generation unit to generate rule candidates and store the generated rule candidates, and a rule minimality decision unit to check minimality of each of the generated rule candidates and output the generated rule candidate to an output apparatus when the generated rule candidate is determined to be minimal.

10 Claims, 4 Drawing Sheets

(51) Int. Cl.
*G06F 17/30* (2006.01)
*G06Q 30/02* (2012.01)
*G06N 3/00* (2006.01)
*G06N 99/00* (2010.01)
*G06N 3/08* (2006.01)
*G06N 3/04* (2006.01)

(52) U.S. Cl.
CPC ........... *G06N 3/0436* (2013.01); *G06N 3/086* (2013.01); *G06N 99/005* (2013.01); *G06Q 30/02* (2013.01)

(56) References Cited

U.S. PATENT DOCUMENTS

2008/0215518 A1* 9/2008 Matsuda ............. H04L 63/0263
  706/47
2010/0250596 A1   9/2010 Fan et al.
2011/0138312 A1* 6/2011 Yeh ................... G06F 17/30539
  715/771

OTHER PUBLICATIONS

Kota Kanda et al., "Removing Redundancy in Association Rules with Weakly Closed Itemset," 2001 Nendo Annual Conference of JSAI (Dai 15 Kai) Ronbunshu [CD-ROM], May 25, 2001, pp. 1-3 (2D1-07).

Wenfei Fan et al., "Discovering Conditional Functional Dependencies," IEEE International Conference on Data Engineering, 2009, pp. 1231-1234.

Chiang et al., "Discovering Data Quality Rules," VLDB Aug. 2008, (12 pages).

* cited by examiner

RULE DISCOVERY SYSTEM, METHOD, APPARATUS, AND PROGRAM

CROSS-REFERENCE TO RELATED APPLICATIONS

This application is a national stage application of International Application No. PCT/JP2013/063317 entitled "Rule Discovery System, Method, Apparatus and Program," filed on May 13, 2013, which claims the benefit of the priority of Japanese Patent Application No. 2012-110922, filed on May 14, 2012, the disclosures of each which are incorporated herein in their entirety.

The present invention relates to a technique to discover a rule. More specifically, the invention relates to a system, a method, an apparatus, and a program configured to discover a rule for a database.

BACKGROUND

In rule discovery in a database, a rule is expressed as CFD (Conditional Function Dependency) and a CFD rule(s) corresponding with contents of the database, out of generated CFD rule candidates, is(are) output. The following gives a brief survey of CFD which is to be a basis for understanding the invention.

CFD is a rule indicating that a functional dependency (abbreviated as "FD") expressing dependency among data attributes, holds for a tuple set specified by a condition. CFD includes a conditional part and an antecedent (premise) part, which are on a left hand side (LHD) of the rule, and a consequent part on a right hand side (RHD) of the rule, to which attributes are respectively specified. The conditional part and the consequent part are also referred to as a conditional clause and a subordinate clause, respectively.

The conditional part specifies a subset of data (tuple set). The conditional part represents that an attribute X is of an attribute value x by using a notation "X=x", where "x" means that the attribute is of a specified value. Such representation of the attribute value is termed "Constant" (where "Constant" means, for example, "a constant value").

The antecedent part of the rule includes specification of only an attribute. The attribute value not taking a specified value (that is, a wildcard indicating matching to any value), is expressed as "X=_". Such representation of the attribute value is termed "Variable". Note that Variable means, for example, a variable. Here, "_" is termed "unnamed variable".

There are two sorts of the consequent parts.
(A) a consequent part (such as that in the following rule 1) constituted by specifying an attribute and an attribute value; and
(B) a consequent part (such as that in the following rule 2) constituted by specifying only an attribute.

In the case of (A), a consequent part is represented as "A=a", for example.

In the case of (B), a consequent part is represented as "A=_" or the like, for example. When the consequent part has the attribute value specified, the antecedent (premise) part is allowed to be omitted. The antecedent (premise) part and the consequent part may be constituted by specifying a plurality of attributes and respective attribute values of the attributes. The followings are examples of rules.
rule 1: X1→A (x1∥a)
rule 2: X1, X2→A (x1, _∥_)

The rule 1 is a rule that states: "If an attribute X1 is of an attribute value x1, the attribute A is of an attribute value a".

If the rule 1 holds, it means that, in a tuple set matched to the conditional part, the consequent part is of the specified value. That is, in all tuples of the tuple set satisfying the condition X1=x1, t[A]=a (where t[A] indicates a tuple of the attribute A). Such a rule in which the consequent part is determined at a specified value is termed a constant CFD (Constant CFD).

The rule 2 is a rule that states: "If an attribute X1 is of an attribute value x1, the attribute A is determined in accordance with the attribute X2". If the rule 2 holds, it means that, in a tuple set matched to the conditional part, a dependency is present between the attributes specified by the antecedent part and the consequent part. That is, if, for any tuple pair t1 and t2 of the tuple set, satisfying the condition "X1=x1", t1[X2]=t2[X2], then t1[A]=t2[A]. Such a rule in which the consequent part is not determined at a specified value but has a dependency between attributes is termed a variable CFD (Variable CFD). That is, such CFD in which the right hand side of ∥ in the pattern tuple is an unnamed variable '_' (tp[A]=_), the rule is termed a variable CFD (Variable CFD).

The symbol '∥' in the pattern tuple (x1∥a) of the rule 1 separates the attribute value of X1 on the left hand side from the attribute value of A on the right hand side. Note that there is also used a notation in which "X1→A (x1∥a)" of the rule 1 is denoted as "(X→A, (x∥a))". Such notation differs only as to the presence of comma and the outer parenthesis, and the two obviously express the same rule. In similar manner, "X1, X2→A(x1, _∥_)" of the rule 2 may be alternatively denoted as "([X1, X2]→A, (x1, _∥_))".

As indices indicating degree of effectiveness of CFD for given data, a support and a confidence, for example, are used. The support is the number of tuples to which a conditional part and an antecedent part of a CFD are both matched.

The confidence is a ratio of the number of tuples satisfying the CFD rule to the number of tuples to which a conditional part and an antecedent part are both matched Given a plurality of CFDs, such CFD satisfying both conditions of left-reduced and most general is termed minimal. The following describes "left-reduced". Given a plurality of CFDs, a CFD, an attribute set of the left-hand side (LHS) of which does not include an attribute set of the left hand side of any other CFD is said to be "left-reduced".

When the following rules 3 and 4 are given, for example, the left hand side of the rule 4 includes the left hand side of the rule 3 (X1 ⊂ X1, X2). Thus, the rule 4 is not "left-reduced". Conversely, the left hand side of the rule 3 does not include the left hand side of the rule 4. Thus, the rule 3 is said to be "left-reduced". In this case, the rule 4 may be deleted as a redundant CFD with respect to the rule 3.

Rule 3: X1, Y→A (x1, _∥_

Rule 4: X1, X2, Y→A (x1, x2, _∥_)

The following describes "most-general". Given a plurality of CFDs, when a constant of an attribute value included in the left hand side of any CFD cannot be updated to '_' (Variable), such a CFD is said to be "most-general".

When the following rules 5 and 6 are given, for example, the rule 5 can be obtained by replacing an attribute value x2 of the rule 6 by a variable. Thus, the rule 6 is not "most-general". Conversely, the rule 5 is "most-general". In this case, the rule 6 is a redundant CFD with respect to the rule 5 and may be deleted as such.

Rule 5: X1, X2→A (x1, _‖a)
Rule 6: X1, X2→A (x1, x2‖a)

The foregoing is the outline of the CFD.

An apparatus that discovers a rule from a database includes a storage means (storage unit), such as a magnetic disc, in which a CFD is stored, a calculation means (calculation unit) that generates a CFD candidate and that decides whether or not the CFD candidate is matched to the contents of the database, and a saving means (saving unit) that stores the CFD, decided to match to contents of the database, in a storage apparatus or memory. The storage means stores the CFD obtained using the rule discovery algorithm. The calculation means generates a CFD candidate, as a subject to be checked, checks for whether or not it is matched to contents of the database and if matched, the calculation means outputs the CFD as being a valid CFD. The saving means stores the valid CFD obtained in the storage apparatus.

As techniques to discover a rule in a database, the following techniques are known, as disclosed in, for example, Non-Patent Literature 1:

(1) a technique of generating a candidate of a constant CFD from a free itemset and a corresponding closed itemset;

(2) a technique of generating a CFD candidate by generating a list of attribute-value pairs by a breadth first search, placing one of the terms in a subordinate term (indicated as A) and placing the other term in a conditional part (indicated as X) to obtain an expression:

X→A; and (3) a technique of setting a free itemset as a conditional term, placing one attribute not included in the free itemset in a subordinate term (consequent part) and searching an attribute added to the conditional term by depth first search to generate a CFD candidate.

The free itemset is a set of items in which a frequency thereof is truly increased when removing any one or more item(s). An attribute-value pair appearing in a database is termed an item, and a set of items is termed an itemset.

As described above, there is a confidence among the indices indicating to what extent contents of a database coincide with a CFD.

Non-Patent Literature 2 discloses a technique for discovering a rule (CFD) which, though not fully coincident with contents of a database, has a high confidence value. According to this discovery technique, breadth first search is used to discover a CFD having a confidence greater than or equal to a threshold value. Such CFD is referred to as "approximate CFD" meaning that the CFD "substantially holds".

To check for validity of a rule, there is disclosed a rule base management apparatus in, for example, Patent Literature 1. The rule base management apparatus includes a rule base to store a rule including a conditional part and a conclusion part, an instance information database to store the instance information concerning results of application of the rule, and a correlation unit to correlate a rule and the instance information satisfying the rule, a validity check unit to cause an instance retrieving unit to retrieve sets of instance information from the instance information database, using the conditional part of the rule to be checked for validity as a key, and calculate the ratio of the instance information satisfying the consequent part of the rule to check the validity of the rule in the set of the instance information based on the ratio thus found. There is also disclosed in Patent Literature 2 a configuration in which a functional dependency (FD) between attributes of a relation to perform normalization by relation splitting.

PATENT LITERATURE (PTL)

[PTL 1]
International Publication No. WO2004/36496
[PTL 2]
JP Patent Kokai Publication No. JP-H06-110749A

NON-PATENT LITERATURE (NPL)

[NPL 1]
Wenfei Fan et al., "Discovering Conditional Functional Dependencies," pp. 1231-1234, IEEE International Conference on Data Engineering, 2009 [Searched on Apr. 9, 2012] Internet URL<http://homepages.inf.ed.ac.uk/fgeerts/pdf/icde09.pdf>
[NPL 2]
Chiang et al., "Discovering Data Quality Rules," in VLDB, 2008, [Searched on Apr. 9, 2012] Internet URL<http://dblab.cs.toronto.edu/~fchiang/docs/vldb08.pdf>

SUMMARY

The following describes an analysis of the related arts by the inventor of the present invention.

A first problem is that CFDs obtained by the CFD discovery algorithm, disclosed in Non-Patent Literature 1, are only those which fully hold for a database, that is, those having the confidence equal to 1, while it is not possible to enumerate those which "substantially hold" for the database.

A second problem is that the algorithm for discovering a CFD which "substantially hold" (approximate CFD), disclosed in Non-Patent Literature 2, takes extremely long time for computation. The reason is that the number of CFDs (approximate CFDs) generated tends to lead to combinational explosions for large-scale databases, in particular for databases with larger numbers of attributes.

The present invention has been invented in view of the above-mentioned problems. It is an object of the present invention to provide a system, an apparatus, a method, and a program that are capable of efficiently obtaining a set of rules useful for grasping or modifying contents of a database.

According to the present invention, there is provided a rule discovery system comprising:

a storage apparatus configured to store a database;
a data processing apparatus; and
an output apparatus, wherein
the data processing apparatus includes;
a free itemset generation unit to generate a free itemset including a set of items of attribute-value pairs in the database, the free itemset having a frequency in the database being greater than or equal to a predetermined threshold value set in advance;
a valid rule candidate generation unit to generate a rule candidate including a condition part having the generated free itemset set thereto and a consequent part having an item that does not share an attribute with the free itemset set thereto, the rule candidate having a confidence greater than or equal to a confidence threshold value set in advance, and to store the generated rule candidate in a storage unit; and
a rule minimality decision unit to check minimality of the rule candidate generated by the valid rule candidate generation means and to output the rule candidate to the output apparatus when the rule candidate is determined to be minimal.

According to another aspect of the present invention, there is provided a method of discovering a rule from a database by a data processing apparatus, the method comprising:

(a) reading the database, generating a free itemset that includes a set of items of attribute-value pairs in the database and that has a frequency in the database greater than or equal to a predetermined threshold value set in advance, and storing the generated free itemset in a storage unit;

(b) generating a rule candidate that includes a condition part having the generated free itemset set thereto and a consequent part having an item that does not share an attribute with the free itemset set thereto, and that has a confidence greater than or equal to a confidence threshold value set in advance, and storing the generated rule candidate in a storage unit; and (c) checking minimality of the rule candidate generated by the valid rule candidate generation means and outputting the rule candidate to an output apparatus when the rule candidate is determined to be minimal.

According to further another aspect of the present invention, there is provided a rule discovery program configured to cause a computer to execute the processing including:

(a) reading a database to generate a free itemset that includes a set of items of attribute-value pairs in the database, and that has a frequency in the database greater than or equal to a predetermined threshold value set in advance, and storing the generated free itemset in a storage unit;

(b) generating a rule candidate that includes a condition part having the generated free itemset set thereto and includes a consequent part having an item that does not share an attribute with the free itemset set thereto, the rule candidate having a confidence greater than or equal to a confidence threshold value set in advance, and storing the generated rule candidate in a storage unit; and (c) checking minimality of each of the generated rule candidates and outputting the rule candidate to an output apparatus when the rule candidate is determined to be minimal. According to the present invention, there is provided a storage medium or device such as a memory device, a magnetic/optical disk or the like in which the rule discovery program is recorded.

According to still another aspect of the present invention, there is provided a rule discovery apparatus comprising:

a free itemset generation unit to read a database, and to generate a set of free itemsets each including attribute-value pairs in the database and each having a frequency in the database greater than or equal to a predetermined threshold value set in advance;

a valid rule candidate generation unit to compute a frequency of each of itemsets, each of the itemsets including a condition part having the generated free itemset α set thereto and including a consequent part having one item x that does not share an attribute with each free itemset α set thereto, the valid rule candidate generation unit adding a rule including a condition part having the free itemset α set thereto and including a consequent part having the one item x set thereto to a list as a rule candidate, when a ratio of frequency of the itemset obtained by adding the one item x to the free itemset α to a frequency of the free itemset α is greater than or equal to a predetermined confidence threshold value set in advance; and a rule minimality decision unit to sort the list of a rule candidate group including a plurality of the rules generated by the valid rule candidate generation means in an ascending order of sizes of the rule candidates, the rule minimality decision unit sequentially extracting a minimal one or more of the rule candidates from a head of the list and outputting the extracted minimal one or more of the rule candidates to the output apparatus, the rule minimality decision unit removing, from the list, one or more of the remaining rule candidates in the list that are redundant with respect to the output minimal one or more of the rule candidates, thereby removing one or more of the rule candidates that are not minimal.

According to the present invention, a set of rules useful for grasping or correcting contents of a database can be efficiently obtained. Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION OF DISCLOSURE

The following describes exemplary embodiments of the present invention with reference to the drawings. In discovering a rule(s) from a database, a set of approximate CFDs (constant CFDs, each having a confidence greater than or equal to a preset value), matched to contents of the database, is calculated, based on the database and a parameter(s) (such as frequency and confidence threshold value) entered by a user. More specifically, there are provided a free itemset generation means (21 of FIG. 1) configured to calculate a free itemset based on contents of a database and a parameter(s) supplied by a user;

a rule candidate generation unit (22 of FIG. 1) configured to generate a valid rule candidate(s) based on the free itemset obtained; and a rule minimality decision unit (23 of FIG. 1) configured to check whether or not the valid rule candidate obtained is redundant with respect to a rule(s) already obtained.

According to the exemplary embodiment, a data processing apparatus (2) includes:

a free itemset generation unit (21 of FIG. 1) configured to generate a free itemset that is formed of items, each being an attribute-value pair in the database, and that has a frequency in the database greater than or equal to a predetermined threshold value, a valid rule candidate generation unit (22 of FIG. 1) configured to generate a rule candidate and store the generated rule candidate in a storage unit, wherein the rule candidate includes a conditional part having the generated free itemset set thereto, and a consequent part having an item not sharing an attribute with the free itemset set thereto, and the rule candidate has a confidence greater than or equal to a predetermined threshold value of the confidence, and a rule minimality decision unit (23 of FIG. 1) configured to check whether or not the rule candidate (s) generated by the valid rule candidate generation unit is minimal and to output the rule candidate to the output apparatus (4 of FIG. 1) if the rule candidate is minimal.

The rule minimality decision unit (23 in FIG. 1) sorts a list of a rule candidate group constituted from a plurality of the rule candidates generated by the valid rule candidate generation unit in an ascending order of sizes of the rule candidates. The rule minimality decision unit sequentially extracts a minimal one or more of the rule candidates from the head of the list and outputs the extracted minimal one or more of the rule candidates to the output apparatus (4). Then, the rule minimality decision unit removes, from the list, one or more of the rule candidates that are redundant with respect to the output minimal one or more of the rule candidates, thereby removing one or more rules that are not minimal.

Figure 1:
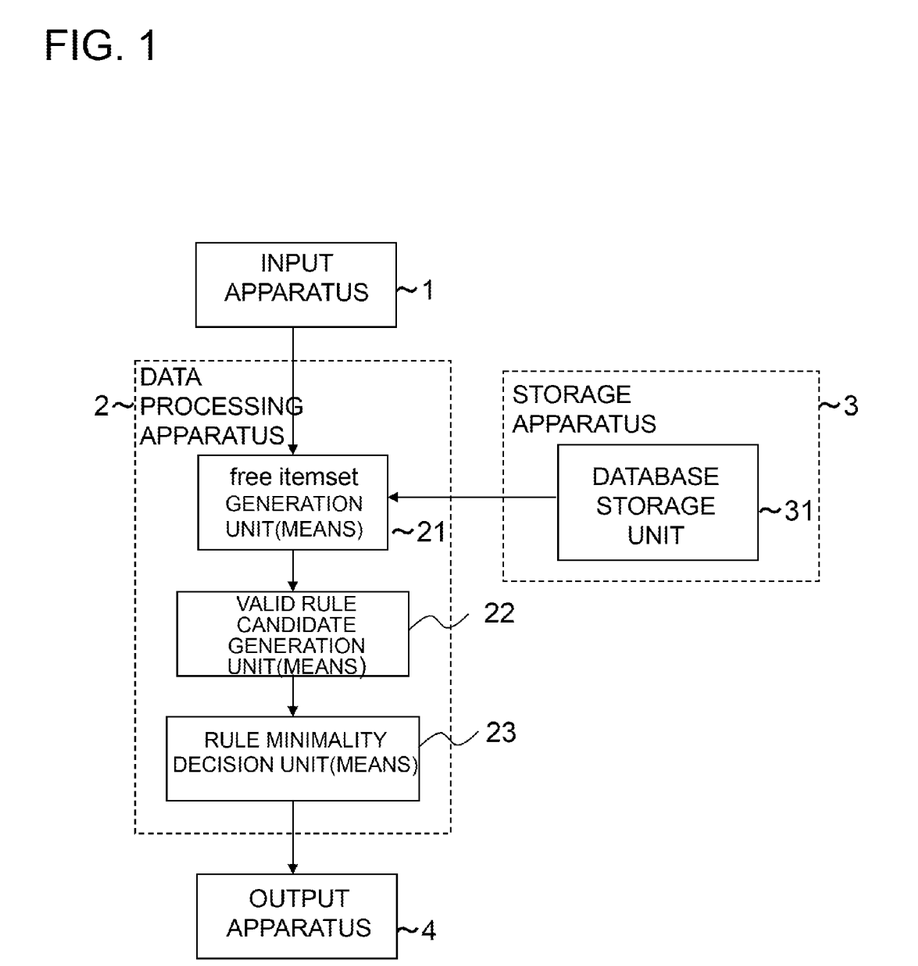
FIG. 1 is a diagram illustrating a configuration of a first exemplary embodiment of the present invention.

The rule candidate generation unit (22 in FIG. 1) computes the frequency of an itemset obtained by adding one item x that does not share an attribute with the free itemset $\alpha$ to the free itemset $\alpha$;

in the case wherein a ratio of a frequency ratio of the itemset obtained by adding the one item to the free itemset to a frequency of the free itemset is greater than or equal to the confidence threshold value, the rule candidate generation unit performs a process of adding to the list a rule including a condition part having the free itemset $\alpha$ set thereto and a consequent part having one item x set thereto, until the checking for all combinations of the free itemsets $\alpha$ and the item x is finished.

According to the present invention, by first computing free itemsets, portions of approximate constant CFDs corresponding to the condition parts can be efficiently enumerated. Further, according to the present invention, candidates for approximate constant CFDs are each rearranged in an ascending order of the size of the condition part. Then, the candidates are extracted from the head of the list, and the approximate constant CFD that includes a redundant term with respect to each extracted approximate constant CFD is removed. For this reason, only a minimal approximate constant CFD(s) can be efficiently obtained. As a result, a set of the approximate constant CFDs useful for grasping or correcting the contents of the database by the user can be efficiently obtained. A description will be given below in connection with an exemplary embodiment.

First Exemplary Embodiment

Referring to FIG. 1, a first exemplary embodiment of the present invention includes an input apparatus 1 such as a keyboard, a data processing apparatus 2 configured to operate by program control, a storage apparatus 3 configured to store information, and an output apparatus 4 such as a display apparatus or a printing apparatus.

The storage apparatus 3 includes a database storage unit 31. In the database storage unit 31, there is stored in advance a database from which a rule(s) is (are) to be extracted.

The data processing apparatus 2 includes a free itemset generation unit (means) 21, a valid rule candidate generation unit (means) 22 and a rule minimality decision unit (means) 23.

The free itemset generation means 21 generates a free itemset of the database stored in the database storage unit 31, using a parameter (such as a frequency threshold value k) supplied from the input apparatus 1.

The free itemset generation means 21 stores the generated free itemset in a not shown storage unit in the data processing apparatus 2, a not shown storage unit in the free itemset generation means 21, or a predetermined storage region in the storage apparatus 3. An attribute-value pair appearing in the database is called as an "item", and a set of items is referred to as an "itemset".

The valid rule candidate generation means 22 puts the free itemset generated by the free itemset generation means 21 on the condition part of a rule, and puts an item that does not share an attribute with the free itemset on the consequent part of the rule, thereby generating the rule that is valid (whose confidence is greater than or equal to a threshold value p), and adds the generated valid rule to a list L to store the generated valid rule.

The valid rule candidate generation means 22 stores the list L to which the valid rule has been added in a not shown storage unit (e.g., a memory such as a DRAM (dynamic random access memory), a magnetic disk, or the like) in the data processing apparatus 2, a not shown storage unit in the valid rule candidate storage means 22, or a predetermined storage region in the storage apparatus 3.

The rule minimality decision means 23 outputs the rule (valid rule) generated by the valid rule candidate generation means 22 to the output apparatus 4, when the generated rule is determined to be minimal. Herein, rule being "minimal" means that the rule loses its validity when arbitrary one or more items are removed from a condition part of the rule.

Specifically, to take an example, the valid rules obtained by the valid rule candidate generation means 22 are each sorted in an ascending order of the size and is then stored in the list L, and rule candidates are sequentially extracted from the head of the list L and are output. The rule that is included in the list L and is redundant with respect to each currently extracted rule is removed, for example. The rule that is not minimal is thereby removed.

Next, operation of the present exemplary embodiment will be described in detail with reference to FIGS. 1 and 2.

The parameter supplied from the input apparatus 1 and contents of the database given from the database storage unit 31 are supplied to the free itemset generation means 21.

The free itemset generation means 21 extracts, from attribute-value pairs (referred to as items appearing in the database, all free itemsets (referred to as "frequent free itemsets") whose frequencies are each greater than or equal to a threshold value k (in step A1). As described above, a free itemset is a set of items whose frequency is truly increased by removing arbitrary one or more items (items).

Next, the valid rule candidate generation means 22 generates a valid rule candidate from each of the free itemsets generated by the free itemset generation means 21. Specifically, when an item (item) that does not share an attribute with a free itemset $\alpha$ is indicated by x, the valid rule candidate generation means 22 computes the frequency of the free itemset $\alpha$ and the frequency of an itemset (itemset) ($\alpha+\{x\}$) in which one item x is added to the free itemset $\alpha$ (in step A2).

The valid rule candidate generation means 22 checks whether or not a ratio (frequency of $\alpha+\{x\}$)/(frequency of $\alpha$)

that is a ratio of a frequency of the itemset (α+{x}), in which the one item x is added to the free itemset α, to a frequency of the free itemset α is greater than or equal to the confidence threshold value p (in step A3).

When the ratio (frequency of α+{x})/(frequency of α)≥p, the valid rule candidate generation means 22 adds a constant CFD of ψ: α→x to the list L as a candidate for a valid rule (approximate constant CFD) (in step A4).

The valid rule candidate generation means 22 determines whether or not the checking in step A3 (checking whether or not the ratio (frequency of α+{x})/(frequency of α) is greater than or equal to the confidence threshold value p) has been finished for all combinations of the free itemsets α and the item x (in step S5). When the valid rule candidate generation means 22 determines that the checking in step A3 is not finished for all the combinations of the free itemsets α and the item x, the procedure returns to step A2. Then, the checking in step A3 is performed for all the combinations of the free itemsets α and the item x.

When the valid rule candidate generation means 22 determines that the checking in step A3 has been finished for all the combinations of the free itemsets α and the item x, the rule minimality decision means 23 checks whether or not the rule of each rule candidate (approximate constant CFD) in the list L generated by the valid rule candidate generation means 22 is minimal.

Specifically, the rule minimality decision means 23 sorts the elements of the list L in the ascending order of the size (number of items in the CFD condition part) of each element (in step A6).

The rule minimality decision means 23 sequentially extracts each element (rule ψ: approximate constant CFD) from the head of the list L where the elements of the list L are each sorted in the ascending order of the size, and outputs the extracted rule (ψ) to the output apparatus 4 (in step A7).

The rule minimality decision means 23 removes, from among the rule candidates included in the list L, the rule candidate that is redundant with respect to the rule (ψ) currently extracted from the list L and output (in step A8).

The rule minimality decision means 23 determines whether or not the list L is vacant (in step A9). When the rule minimality decision means 23 determines that the list L is not vacant (branching to No in step A9), the procedure returns to the process in step A7. When the rule minimality decision means 23 determines that the list L is vacant (branching to Yes in step A9), the rule minimality decision means 23 finishes computation for rule discovery.

The following describes the operation and effect of the present exemplary embodiment will be described.

In the present exemplary embodiment, a rule to be discovered is limited to a constant CFD (approximate constant CFD) that substantially holds. By enumerating free itemsets initially, all candidates for the condition parts of approximate constant CFDs ar enumerated. For this reason, generation of the candidates for the constant CFD (approximate constant CFDs) that substantially hold can be reduced to as little as possible.

Since minimality of each rule is checked in the ascending order of the size of the condition part of the constant CFD, an increase in time needed for determination of the minimality can be reduced. As a result, efficient discovery of the rule becomes possible.

Next, the operation of the present exemplary embodiment will be described, using a specific example. A data set, made up by attributes and tuples of the following Table 1, is registered in the database storage unit 31, as shown in FIG. 3B, which is the same as the Table 1. It is noted that the database example is simplified only for the sake of explanation. FIG. 3A illustrates a specific example of free itemsets, the list L and the minimality decision process in the rule minimality decision means 23 corresponding to the steps in FIG. 2.

Figure 2:
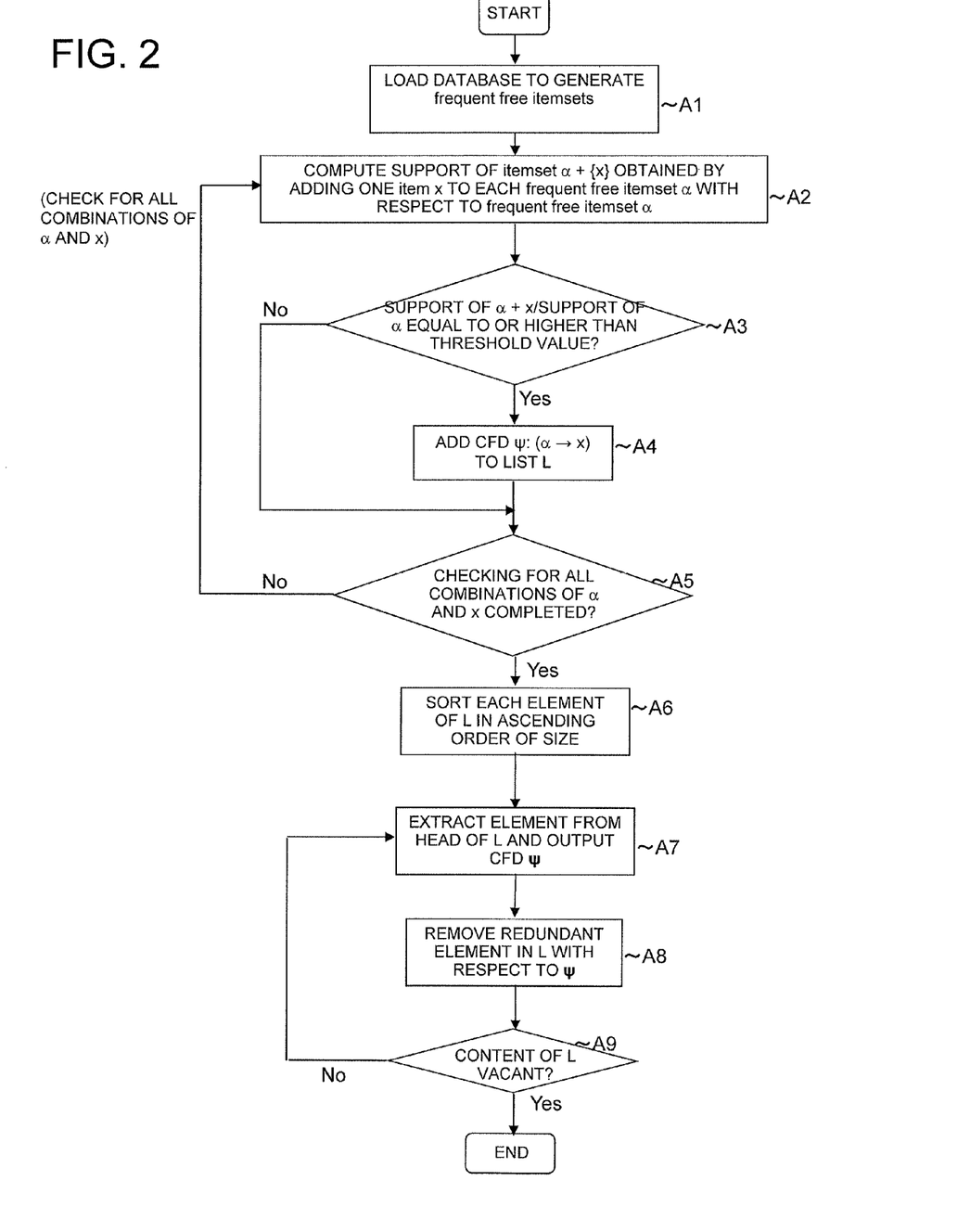
FIG. 2 is a flow chart illustrating operation of the first exemplary embodiment of the present invention.
Figures 3A, 3B, 3C:
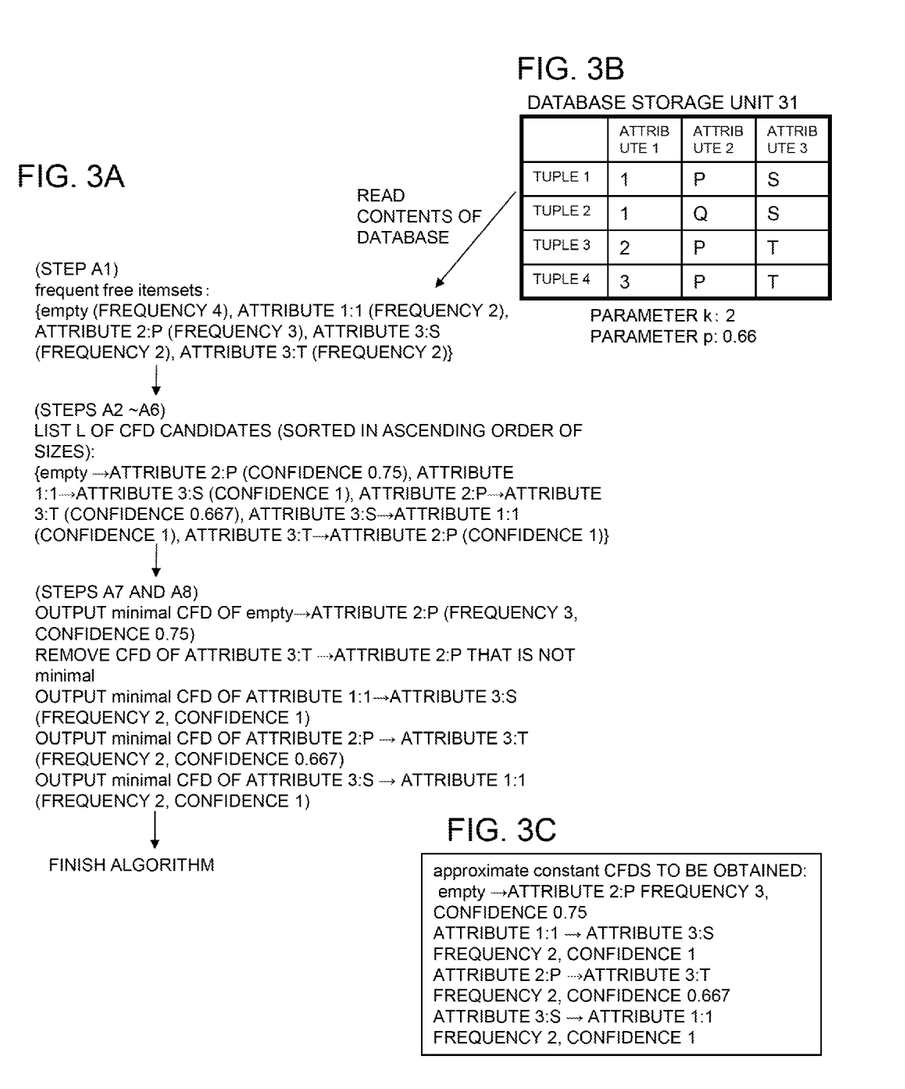
FIG. 3A to 3C are a diagrams for explaining a specific example of the operation of the first exemplary embodiment of the present invention.

FIG. 3C shows examples of rules (approximate CFDs) output from the output apparatus 4 as a result of the calculations of FIG. 2. It is noted that, in FIGS. 3A-3C, a symbol : in "attribute 1:_", "attribute 1:1" or the like is synonymous (same) with a symbol = in the "attribute 1=_", "attribute 1=1" or the like.

TABLE 1

|  | Attribute 1 | Attribute 2 | Attribute 3 |
| --- | --- | --- | --- |
| Tuple 1 | 1 | P | S |
| Tuple 2 | 1 | Q | S |
| Tuple 3 | 2 | P | T |
| Tuple 4 | 3 | P | T |

The free itemset generation means 21 receives the above-mentioned table 1, and, as parameters, k=2 and p=0.66, where k denotes a lower limit of the frequency (threshold value) and p is a lower limit of the confidence (threshold value) both for determining whether or not a rule is valid.

The free itemset generation means 21 extracts a set of all free itemsets, each having a frequency of occurrence in the database greater than or equal to k=2, which are:

{empty (4), "attribute 1=1" (2), "attribute 2=P" (3), "attribute 3=S" (2), "attribute 3=T" (2)} (each numerical value in parentheses denotes the frequency of the free itemset) (refer to step A1 in FIG. 2 and FIG. 3A).

For these five free itemsets, the following valid CFD rules having these five free itemsets provided in the condition parts of the CFDs are obtained.

First, assuming x="attribute 2=P" for α=empty,
a frequency of empty is 4 (which is equal to the number of all the tuples), and
a frequency of "attribute 2=P" is 3.

The ratio (confidence) of the frequency of "attribute 2=P" and to the frequency of empty is:
(frequency of "attribute 2=P")/(frequency of empty)=¾=0.75.

This value of 0.75 exceeds the confidence threshold value of 0.66.

For this reason, the valid rule candidate generation means 22 adds

CFD ψ: empty→"attribute 2=P" (frequency=3, and confidence=0.75)

to the list L, as a valid rule candidate.

Similarly, the valid rule candidate generation means 22 adds the following four CFDs (approximate constant CFDs) that substantially hold to the list L as valid rule candidates (in steps A2 to A4):

"attribute 1=1"→"attribute 3=S" (frequency=2, and confidence=1),

"attribute 2=P"→"attribute 3=T" (frequency=2, and confidence=⅔=0.667),

"attribute 3=S→attribute 1=1" (frequency=2, and confidence=1),

"attribute 3=T→attribute 2=P" (frequency=2, and confidence=1).

The rule minimality decision means 23 sorts (rearranges) each element (rule candidate) in the list L in the ascending order of the size (in step A6 in FIG. 2). As a result, the rule:

empty→"attribute 2=P"
appears at a head of the list L (refer to the list L of the CDF candidates in (step A2 to A6) in FIG. 3A.

The rule minimality decision means 23 extracts this rule:
empty→"attribute 2=P"
from the head of the list L.

Since this is a minimal rule, this rule is output to the output apparatus 4. In this case, out of the rule candidates that are present in the list L, the rule candidate:
"attribute 3=T"→"attribute 2=P"
is redundant with respect to the currently extracted rule candidate:
empty→"attribute 2=P".

Thus, the rule minimality decision means 23 removes the rule candidate:
"attribute 3=T"→"attribute 2=P"
from the list L.

Next, the rule minimality decision means 23 sequentially extracts the remaining rule candidates that are present in the list L, which are:
"attribute 1=1"→"attribute 3=S" (frequency=2, and confidence=1),
"attribute 2=P"→"attribute 3=T" (frequency=2, and confidence=0.667), and
"attribute 3=S"→"attribute 1=1" (frequency=2, and confidence=1), and then sequentially output these rule candidates to the output apparatus 4.

When the above-mentioned rule candidates are individually extracted from the list L, there is no redundant rule with respect to any of these rule candidates in the list L.

For this reason, the rule minimality decision means 23 outputs the above-mentioned four approximate constant CFDs. As a result, the list L becomes empty, so that the rule discovery algorithm is finished (in steps A7 to A9).

Second Exemplary Embodiment

Figure 4:
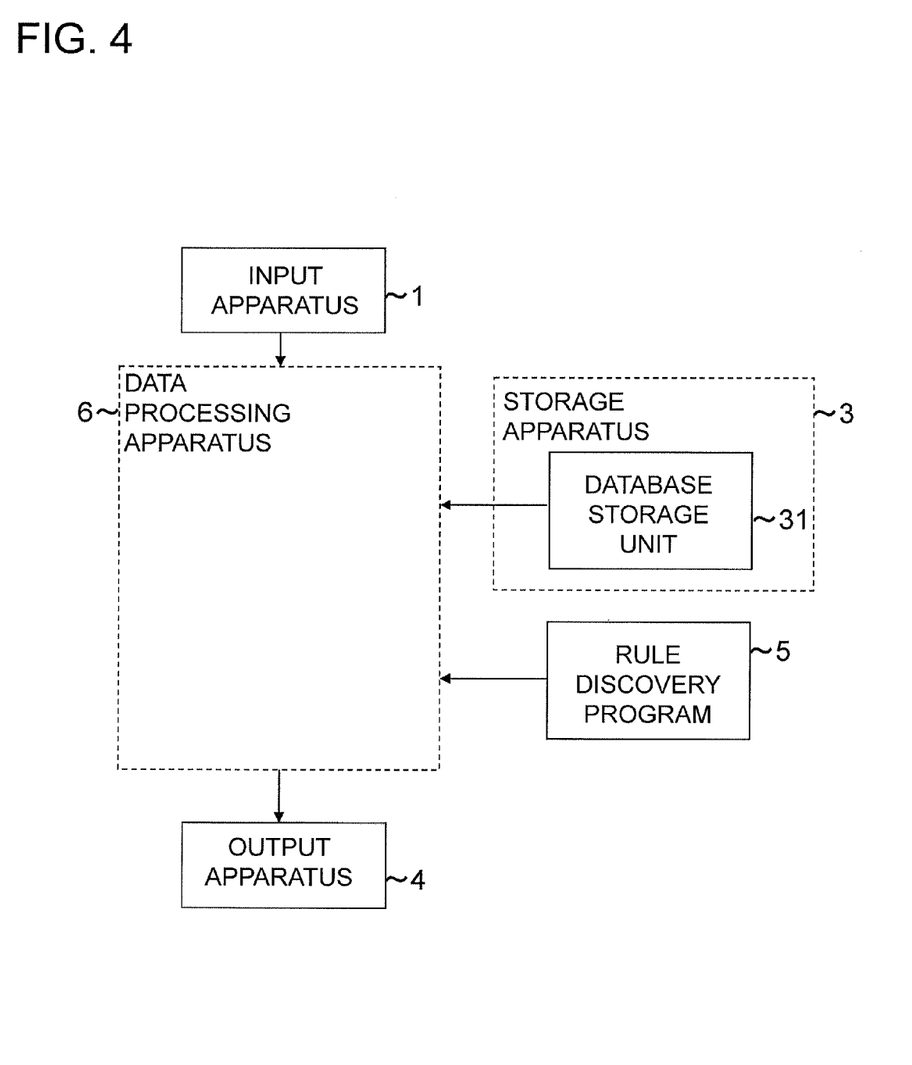
FIG. 4 is a diagram illustrating a second exemplary embodiment of the present invention.

Next, a second exemplary embodiment of the present invention will be described in detail, with reference to the drawings. Referring to FIG. 4, the second exemplary embodiment of the present invention includes a rule discovery program 5. The rule discovery program 5 is loaded into a data processing apparatus 6 to control the operation of the data processing apparatus 6. By control of the rule discovery program 5, the data processing apparatus 6 executes the following processes, which are identical to the processes by the data processing apparatus 2 in the first exemplary embodiment described with reference to FIGS. 1 to 3.

When a parameter(s) is (are) supplied from the input apparatus 1, the data processing apparatus 6 first generates a free itemset, using a database stored in a database storage unit 31 in a storage apparatus 3.

Next, the data processing apparatus 6 generates a valid rule candidate from the generated free itemset, and is added to a list L.

The data processing apparatus 6 causes a minimal one or more of a set of valid rule candidates stored in the list L to be displayed on the output apparatus 4.

In the above-mentioned exemplary embodiments, the list L to which a rule candidate is to be added is not limited to a data structure such as a linear list or a queue (Queue). An arbitrary storage configuration (data structure) or a storage region for arrangement or the like may be of course used if the storage configuration or the storage region can store a result obtained by sequentially sorting each element in the order of the size of the element, for example.

Each disclosure of the above-listed Patent Literatures and Non-Patent Literatures is incorporated herein by reference. Modification and adjustment of each exemplary embodiment and each example are possible within the scope of the overall disclosure (including the claims) of the present invention and based on the basic technical concept of the present invention. Various combinations and selections of various disclosed elements (including each element of each claim, each element of each example, each element of each drawing, and the like) are possible within the scope of the claims of the present invention. That is, the present invention naturally includes various variations and modifications that could be made by those skilled in the art according to the overall disclosure including the claims and the technical concept. With respect to a numerical value range described herein, an arbitrary numerical value and a small range included in the numerical value range should be construed to be specifically described even unless otherwise explicitly described.

The invention claimed is:

1. A rule discovery system comprising:
   a storage apparatus configured to store a database;
   a data processing apparatus; and
   an output apparatus, wherein
   the data processing apparatus includes;
   a free itemset generation unit to generate a free itemset including a set of items of attribute-value pairs in the database, the free itemset having a frequency in the database greater than or equal to a predetermined threshold value set in advance;
   a valid rule candidate generation unit to generate a rule candidate including a condition part having the generated free itemset set thereto and a consequent part having an item that does not share an attribute with the free itemset set thereto, the rule candidate having a confidence greater than or equal to a confidence threshold value set in advance, and to store the generated rule candidate in a storage unit, when a ratio of a frequency of the itemset obtained by adding one item x to a free itemset α to a frequency of the free itemset α is greater than or equal to the confidence threshold value, the valid rule candidate generation unit adding to a list of a rule candidate group including a plurality of the rule candidates a rule including a condition part having a free itemset α set thereto and a consequent part having the one item x set thereto; and
   a rule minimality decision unit to check minimality of the rule candidate generated by the valid rule candidate generation unit and to output the rule candidate to the output apparatus when the rule candidate is determined to be minimal.

2. The rule discovery system according to claim 1, wherein the rule minimality decision unit sorts the list of the rule candidate group generated by the valid rule candidate generation unit in an ascending order of sizes of the rule candidates,
   the rule minimality decision unit sequentially extracts, from a head of the list, a minimal one or more of the rule candidates and outputs the extracted minimal one or more of the rule candidates to the output apparatus, and
   the rule minimality decision unit removes, from the list, one or more of the remaining rule candidates in the list that are redundant with respect to the output minimal one or more of the rule candidates.

3. The rule discovery system according to claim 1, comprising an input apparatus configured to receive a threshold value of the frequency and the threshold value of the confidence as setting parameters.

4. The rule discovery system according to claim 1, wherein the rule is a rule expressed as a CFD (Conditional Functional Dependency).

5. A rule discovery system comprising:
a storage apparatus configured to store a database;
a data processing apparatus; and
an output apparatus, wherein
the data processing apparatus includes;
a free itemset generation unit to generate a free itemset including a set of items of attribute-value pairs in the database, the free itemset having a frequency in the database greater than or equal to a predetermined threshold value set in advance;
a valid rule candidate generation unit to generate a rule candidate including a condition part having the generated free itemset set thereto and a consequent part having an item that does not share an attribute with the free itemset set thereto, the rule candidate having a confidence greater than or equal to a confidence threshold value set in advance, and to store the generated rule candidate in a storage unit; and
a rule minimality decision unit to check minimality of the rule candidate generated by the valid rule candidate generation unit and to output the rule candidate to the output apparatus when the rule candidate is determined to be minimal, wherein the valid rule candidate generation unit calculates a frequency of an itemset obtained by adding one item x to each free itemset α, and
when a ratio of a frequency of the itemset obtained by adding the one item x to the free itemset α to a frequency of the free itemset α is greater or equal to the confidence threshold value, the valid rule candidate generation unit repeatedly performs a process of adding to a list of a rule candidate group including a plurality of the rule candidates a rule including a condition part having the free itemset α set thereto and a consequent part having the one item x set thereto, as a rule candidate, until the checking for all combinations of the free itemsets α generated by the free itemset generation unit and the item x is finished.

6. A method of discovering a rule from a database by a data processing apparatus, the method comprising:
(a) reading the database, generating a free itemset that includes a set of items of attribute-value pairs in the database and that has a frequency in the database greater than or equal to a predetermined threshold value set in advance, and storing the generated free itemset in a storage unit;
(b) generating a rule candidate that includes a condition part having the generated free itemset set thereto and a consequent part having an item that does not share an attribute with the free itemset set thereto, and that has a confidence greater than or equal to a confidence threshold value set in advance, and storing the generated rule candidate in a storage unit, when a ratio of a frequency of the itemset obtained by adding one item x to a free itemset α to a frequency of the free itemset α is greater than or equal to the confidence threshold value, adding to a list of a rule candidate group including a plurality of the rule candidates a rule including a condition part having a free itemset α set thereto and a consequent part having the one item x set thereto; and (c) checking minimality of the rule candidate generated and outputting the rule candidate to an output apparatus when the rule candidate is determined to be minimal.

7. The rule discovery method according to claim 6, comprising:
sorting the list of the rule candidate group including the generated rule candidates in an ascending order of sizes of the rule candidates;
sequentially extracting a minimal one or more of the rule candidates from a head of the list and outputting the extracted minimal one or more of the rule candidates to the output apparatus; and
removing, from the list, one or more of the remaining rule candidates in the list that are redundant with respect to the output minimal one or more of the rule candidates.

8. A non-transitory computer readable recording medium storing a program to cause a computer to execute the processing including:
(a) reading a database to generate a free itemset that includes a set of items of attribute-value pairs in the database, and that has a frequency in the database greater than or equal to a predetermined threshold value set in advance, and storing the generated free itemset in a storage unit;
(b) generating a rule candidate that includes a condition part having the generated free itemset set thereto and a consequent part having an item that does not share an attribute with the free itemset set thereto and that has a confidence greater than or equal to a confidence threshold value set in advance, and storing the generated rule candidate in a storage unit, when a ratio of a frequency of the itemset obtained by adding one item x to a free itemset α to a frequency of the free itemset α is greater than or equal to the confidence threshold value, adding to a list of a rule candidate group including a plurality of the rule candidates a rule including a condition part having a free itemset α set thereto and a consequent part having the one item x set thereto; and
(c) checking minimality of each of the generated rule candidates and outputting the rule candidate to an output apparatus when the rule candidate is determined to be minimal.

9. The non-transitory computer readable recording medium storing a program according to claim 8, wherein when the rule candidate is determined to be minimal in the processing (c), the process of outputting the rule candidate to the output apparatus includes:
sorting the list of the rule candidate group including the generated rule candidates in an ascending order of sizes of the rule candidates;
sequentially extracting a minimal one or more of the rule candidates from a head of the list and outputting the extracted minimal one or more of the rule candidates to the output apparatus; and
removing, from the list, one or more of the remaining rule candidates in the list that are redundant with respect to the output minimal one or more of the rule candidates.

10. A rule discovery apparatus comprising:
a free itemset generation unit to read a database and to generate a set of free itemsets each of the free itemsets including attribute-value pairs in the database and each having a frequency in the database greater than or equal to a predetermined threshold value set in advance;
a valid rule candidate generation unit to compute a frequency of each of itemsets, each of the itemsets including a condition part having the generated free itemset set thereto and a consequent part having one item x that does not share an attribute with each free itemset set thereto, the valid rule candidate generation unit adding a rule including a condition part having the free itemset set thereto and a consequent part having the one item x set thereto to a list as a rule candidate, when a ratio of frequency of the itemset obtained by adding the one item x to the free itemset to a frequency of the free itemset is greater than or equal to a predetermined confidence threshold value set in advance; and a rule minimality decision unit to sort the list of a rule candidate group including a plurality of the rules generated by the valid rule candidate generation unit in an ascending order of sizes of the rule candidates, the rule minimality decision unit sequentially extracting a minimal one or more of the rule candidates from a head of the list and outputting the extracted minimal one or more of the rule candidates to an output apparatus, the rule minimality decision unit removing, from the list, one or more of the remaining rule candidates in the list that are redundant with respect to the output minimal one or more of the rule candidates, thereby removing one or more of the rule candidates that are not minimal.

\* \* \* \* \*